United States Patent
Kotake et al.

(10) Patent No.: US 11,348,323 B2
(45) Date of Patent: May 31, 2022

(54) INFORMATION PROCESSING APPARATUS FOR CORRECTING THREE-DIMENSIONAL MAP, INFORMATION PROCESSING METHOD FOR CORRECTING THREE-DIMENSIONAL MAP, AND NON-TRANSITORY COMPUTER-READABLE STORAGE MEDIUM FOR CORRECTING THREE-DIMENSIONAL MAP

(71) Applicant: CANON KABUSHIKI KAISHA, Tokyo (JP)

(72) Inventors: Daisuke Kotake, Yokohama (JP); Makoto Tomioka, Kawasaki (JP); Nozomu Kasuya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 16/737,722

(22) Filed: Jan. 8, 2020

(65) Prior Publication Data
US 2020/0143603 A1 May 7, 2020

Related U.S. Application Data

(63) Continuation of application No. PCT/JP2018/025880, filed on Jul. 9, 2018.

(30) Foreign Application Priority Data

Jul. 11, 2017 (JP) .............................. JP2017-135658

(51) Int. Cl.
*G06T 7/73* (2017.01)
*G06T 19/20* (2011.01)
*G06T 7/55* (2017.01)

(52) U.S. Cl.
CPC ................ *G06T 19/20* (2013.01); *G06T 7/55* (2017.01); *G06T 7/74* (2017.01)

(58) Field of Classification Search
CPC .. G06T 19/20; G06T 7/55; G06T 7/74; G06T 2207/30244
See application file for complete search history.

(56) References Cited

U.S. PATENT DOCUMENTS

| 7,529,387 B2 | 5/2009 | Kotake | |
| 9,479,709 B2 * | 10/2016 | Bokari | ................ H04N 5/2621 |

(Continued)

FOREIGN PATENT DOCUMENTS

| JP | 2010-128799 A | 6/2010 |
| JP | 4532982 B | 8/2010 |

(Continued)

OTHER PUBLICATIONS

J. Engel, J. Stuckler, and D. Cremers, "Large-Scale Direct SLAM with Stereo Cameras," Proc. 2015 IEEE/RSJ International Conference on Intelligent Robots and Systems (IROS), pp. 1935-1942, Oct. 2015.

(Continued)

*Primary Examiner* — Said Broome
(74) *Attorney, Agent, or Firm* — Canon U.S.A., Inc. IP Division

(57) ABSTRACT

Based on a three-dimensional map in which three-dimensional information of a scene captured by an image capturing apparatus and a position and orientation of the apparatus are associated with each other and an image captured by the apparatus, a first position and orientation of the apparatus at the time of capturing the image is derived. The map is updated based on the captured image and the first position and orientation. A relative position and orientation between the first position and orientation and a second position and orientation of the apparatus derived by a method different from a method of deriving the first position and orientation or at a point of time different from a point of time of deriving (Continued)

the first position and orientation is derived. The map is corrected based on the relative position and orientation.

19 Claims, 10 Drawing Sheets

(56) References Cited

U.S. PATENT DOCUMENTS

| | | | |
|---|---|---|---|
| 9,495,760 B2* | 11/2016 | Swaminathan | G06T 7/246 |
| 2011/0169861 A1 | 7/2011 | Suzuki | |
| 2014/0320593 A1* | 10/2014 | Pirchheim | H04N 5/23238 |
| | | | 348/36 |
| 2015/0098645 A1* | 4/2015 | Leung | G06F 16/786 |
| | | | 382/154 |
| 2015/0243016 A1* | 8/2015 | Moteki | G06T 7/70 |
| | | | 382/103 |
| 2015/0310617 A1 | 10/2015 | Hara | |
| 2016/0364853 A1* | 12/2016 | Yamaguchi | G06K 9/00671 |

FOREIGN PATENT DOCUMENTS

| | | |
|---|---|---|
| JP | 2011-141828 A | 7/2011 |
| JP | 2015-005220 A | 1/2015 |
| JP | 2015-141676 A | 8/2015 |
| JP | 2015-211363 A | 11/2015 |
| JP | 2017037426 A | 2/2017 |

OTHER PUBLICATIONS

Z.Zhang, "A flexible new technique for camera calibration," IEEE Trans. on Pattern Analysis and Machine Intelligence, vol. 22, No. 11, pp. 1330-1334, Nov. 2000.
V. Lepetit, F. Moreno-Noguer, and P. Fua, "EPnP: an accurate O(n) solution to the PnP problem," International Journal of Computer Vision, vol. 81, No. 2, pp. 155-166, Jan. 2009.
M. Bauer, M. Schlegel, D. Pustka, N. Navab, and G. Klinker, "Predicting and estimating the accuracy of n-occular optical tracking systems," Proc. 5th IEEE and ACM International Symposium on Mixed and Augmented Reality, pp. 43-51, Oct. 2006.
I. Skrypnyk and D. G. Lowe, "Scene modelling, recognition and tracking with invariant image features," Proc. 3rd IEEE and ACM International Symposium on Mixed and Augmented Reality, pp. 110-119, Dec. 2004.
G. Klein and D. Murray, "Parallel Tracking and Mapping for Small AR Workspaces," Proc. 6th IEEE and ACM International Symposium on Mixed and Augmented Reality, pp. 225-234, Nov. 2007.
T. Drummond and R. Cipolla, "Real-time Visual Tracking of Complex Structures," IEEE Transactions on Pattern Analysis and Machine Intelligence, vol. 24, No. 7, pp. 932-946, Jul. 2002.
Tomokazu Sato et al., "Camera Parameter Estimation from a Long Image Sequence by Tracking Markers and Natural Features", The Transactions of the Institute of Electronics, Information and Communication Engineers, Japan, The Institute of Electronics, Information and Communication Engineers, Oct. 1, 2003, vol. J86-D-II, No. 10, pp. 1431-1440.

* cited by examiner

INFORMATION PROCESSING APPARATUS FOR CORRECTING THREE-DIMENSIONAL MAP, INFORMATION PROCESSING METHOD FOR CORRECTING THREE-DIMENSIONAL MAP, AND NON-TRANSITORY COMPUTER-READABLE STORAGE MEDIUM FOR CORRECTING THREE-DIMENSIONAL MAP

CROSS-REFERENCE TO RELATED APPLICATIONS

This application is a Continuation of International Patent Application No. PCT/JP2018/025880, filed Jul. 9, 2018, which claims the benefit of Japanese Patent Application No. 2017-135658, filed Jul. 11, 2017, both of which are hereby incorporated by reference herein in their entirety.

BACKGROUND OF THE INVENTION

Field of the Invention

The present invention relates to a technique of acquiring the position and orientation of an image capturing apparatus.

Background Art

There is provided a SLAM (Simultaneous Localization and Mapping) technique of simultaneously creating the three-dimensional map of a scene and measuring the position and orientation of a camera using an image. This technique is used for alignment between a real space and a virtual object in MR/AR (Mixed Reality/Augmented Reality), self-position estimation of a robot, and the like.

In the SLAM technique using an image, the three-dimensional map is successively updated/extended based on the measured position and orientation of the camera. Since the position and orientation of the camera measured using the image include errors, the three-dimensional map also includes an error. Furthermore, since the position and orientation of the camera are measured based on the three-dimensional map including the error, the position and orientation of the camera further include errors. As a result, a large error is accumulated in the three-dimensional map. To solve this problem, according to NPL 1, the fact (loop closure) that a camera returns to almost the same position is recognized using image similarity, and a three-dimensional map is corrected based on the result of the recognition, thereby reducing an accumulated error.

In the method disclosed in NPL 1, if the moving range of the camera is limited, the accumulated error is not reduced sufficiently, and thus the accuracy of the created three-dimensional map is low. The present invention has been made in consideration of this problem, and provides a technique of reducing an error accumulated in a three-dimensional map even if the moving range of an image capturing apparatus such as a camera is limited.

CITATION LIST

Non Patent Literature

NPL 1: J. Engel, J. Stuckler, and D. Cremers, "Large-Scale Direct SLAM with Stereo Cameras," Proc. 2015 IEEE/RSJ International Conference on Intelligent Robots and Systems (IROS), pp. 1935-1942, 2015.

SUMMARY OF THE INVENTION

According to the first aspect of the present invention, there is provided an information processing apparatus comprising:
a holding unit configured to hold a three-dimensional map in which three-dimensional information of a scene captured by an image capturing apparatus and a position and orientation of the image capturing apparatus are associated with each other;
a first deriving unit configured to derive, based on the three-dimensional map and an image captured by the image capturing apparatus, a first position and orientation of the image capturing apparatus at the time of capturing the image;
an update unit configured to update the three-dimensional map based on the captured image and the derived first position and orientation;
a second deriving unit configured to derive a relative position and orientation between the first position and orientation and a second position and orientation of the image capturing apparatus derived by a method different from a method of deriving the first position and orientation or at a point of time different from a point of time of deriving the first position and orientation; and
a correction unit configured to correct the three-dimensional map based on the relative position and orientation.
According to the second aspect of the present invention, there is provided an information processing method executed by an information processing apparatus, comprising:
deriving, based on a three-dimensional map in which three-dimensional information of a scene captured by an image capturing apparatus and a position and orientation of the image capturing apparatus are associated with each other and an image captured by the image capturing apparatus, a first position and orientation of the image capturing apparatus at the time of capturing the image;
updating the three-dimensional map based on the captured image and the derived first position and orientation;
deriving a relative position and orientation between the first position and orientation and a second position and orientation of the image capturing apparatus derived by a method different from a method of deriving the first position and orientation or at a point of time different from a point of time of deriving the first position and orientation; and
correcting the three-dimensional map based on the relative position and orientation.
According to the third aspect of the present invention, there is provided a non-transitory computer-readable storage medium storing a computer program for causing a computer to function as:
a holding unit configured to hold a three-dimensional map in which three-dimensional information of a scene captured by an image capturing apparatus and a position and orientation of the image capturing apparatus are associated with each other;
a first deriving unit configured to derive, based on the three-dimensional map and an image captured by the image capturing apparatus, a first position and orientation of the image capturing apparatus at the time of capturing the image;
an update unit configured to update the three-dimensional map based on the captured image and the derived first position and orientation;
a second deriving unit configured to derive a relative position and orientation between the first position and orientation and a second position and orientation of the image capturing apparatus derived by a method different from a method of deriving the first position and orientation or at a point of time different from a point of time of deriving the first position and orientation; and a correction unit configured to correct the three-dimensional map based on the relative position and orientation.

Further features of the present invention will become apparent from the following description of exemplary embodiments with reference to the attached drawings.

DESCRIPTION OF THE EMBODIMENTS

The embodiments of the present invention will be described below with reference to the accompanying drawings. Note that the embodiments to be described below are examples of detailed implementation of the present invention or detailed examples of the arrangement described in the appended claims.

First Embodiment

Figure 2:
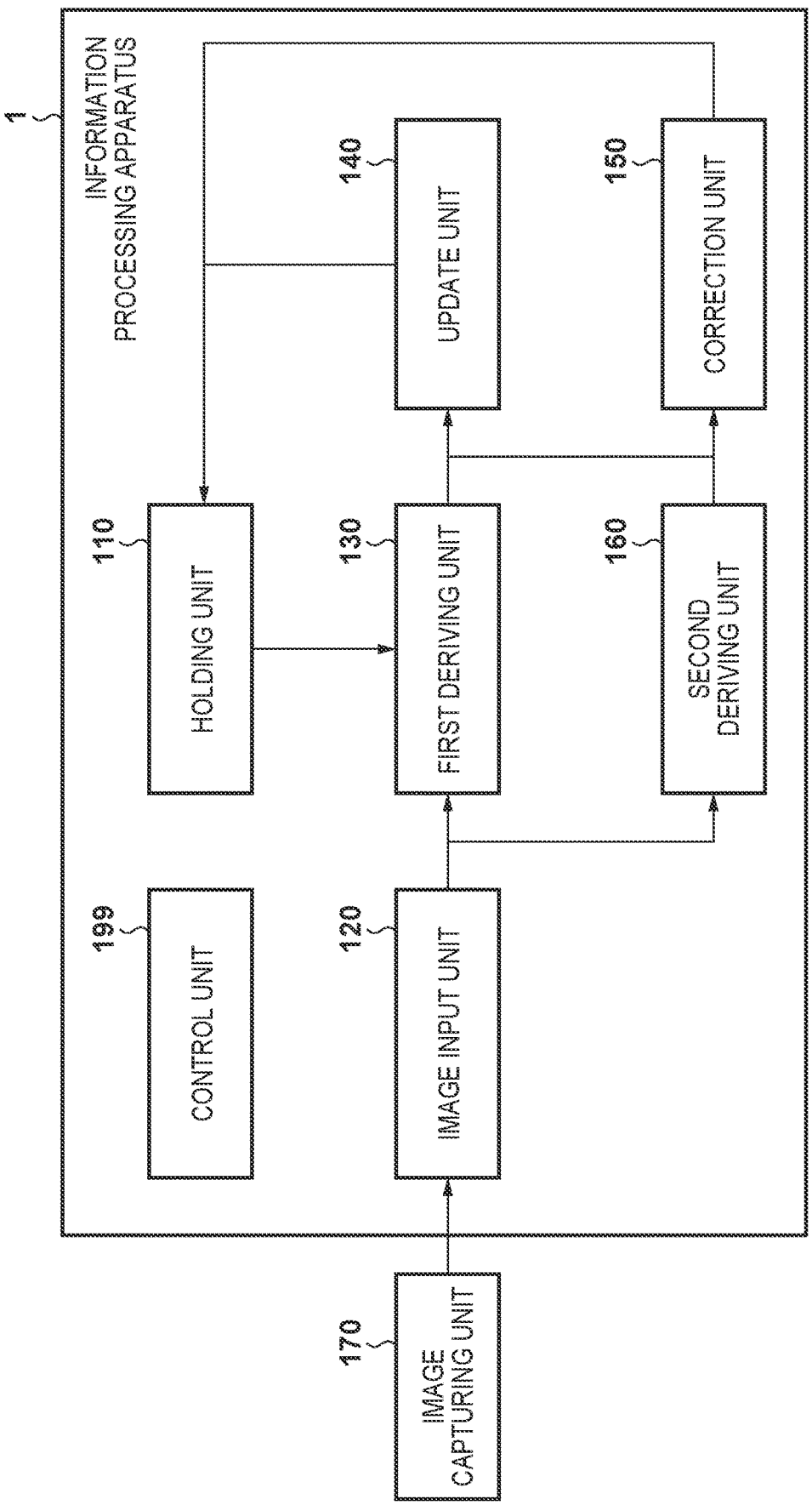
FIG. 2 is a block diagram showing an example of the functional arrangement of a system.

This embodiment will describe a case in which auxiliary features different from features originally existing in a scene are artificially arranged in the scene, and are used to correct a three-dimensional map. An example of the functional arrangement of a system according to this embodiment will be described with reference to a block diagram shown in FIG. 2. As shown in FIG. 2, the system according to this embodiment includes an image capturing unit 170 and an information processing apparatus 1.

The image capturing unit 170 will first be described. The image capturing unit 170 is a stereo camera, and includes the first camera (for example, a left camera) and the second camera (for example, a right camera). Each of the first and second cameras captures a moving image of a scene, and outputs the captured moving image (a captured image of each frame) of the scene to the information processing apparatus 1.

The information processing apparatus 1 will be described next. An image input unit 120 time-serially inputs the captured images from the image capturing unit 170 (from each of the first and second cameras) (for example, 30 frames/sec), and sends the input captured images to a first deriving unit 130 and a second deriving unit 160 of the succeeding stage.

Based on the captured image input from the image input unit 120 and a three-dimensional map held in a holding unit 110, the first deriving unit 130 derives the position and orientation of the image capturing unit 170 in a world coordinate system when capturing the captured image (first acquisition processing). The world coordinate system is a coordinate system having, as an origin, one point in a real space (scene) and three axes orthogonal to each other at the origin as the x-, y-, and z-axes. In this embodiment, the position and orientation, in the world coordinate system, of one (first camera) of the two cameras (first and second cameras) forming the image capturing unit 170 (stereo camera) are obtained as "the position and orientation of the image capturing unit 170 in the world coordinate system". In this embodiment, assume that the position and orientation of the first camera in the world coordinate system represent a six-dimensional vector obtained by combining a three-dimensional vector indicating the position of the first camera in the world coordinate system and a three-dimensional vector indicating the orientation of the first camera in the world coordinate system. The orientation of the first camera is represented by a rotation axis passing through the origin of the world coordinate system and a rotation angle about the rotation axis. Assume that the direction of the three-dimensional vector indicating the orientation represents the direction of the rotation axis, and a norm represents the rotation angle. Furthermore, in this embodiment, a three-dimensional coordinate system having the optical axis of the first camera as a Z-axis, the horizontal direction of the imaging plane of the first camera as an X-axis, and the vertical direction of the imaging plane of the first camera as a Y-axis will be referred to as a camera coordinate system hereinafter, and the position and orientation of the first camera will be referred to as the position and orientation of the image capturing unit 170 hereinafter.

Assume that the intrinsic parameters (focal lengths fx (the horizontal direction of the image) and fy (the vertical direction of the image), image central positions cx (the horizontal direction of the image) and cy (the vertical direction of the image), and a lens distortion parameter) of each of the first and second cameras are known. The intrinsic parameters of each camera are calibrated in advance by, for example, the Zhang method (Z. Zhang, "A flexible new technique for camera calibration," IEEE Trans. on Pattern Analysis and Machine Intelligence, vol. 22, no. 11, pp. 1330-1334, 2000). In addition, the relative position and orientation (extrinsic parameters) between the two cameras (first and second cameras) forming the image capturing unit 170 are calibrated in advance. The extrinsic parameters of the stereo camera are obtained by obtaining the position and orientation of each camera with reference to a pattern whose three-dimensional shape is known by capturing the pattern with the left and right cameras simultaneously, and transforming the position and orientation of each camera into a position and orientation with reference to the left camera (in this embodiment, the first camera) of the stereo camera. Assume that the intrinsic and extrinsic parameters of the image capturing unit 170 are held in a memory (not shown) in the information processing apparatus 1 or an external memory accessible by the information processing apparatus 1.

Figure 3:
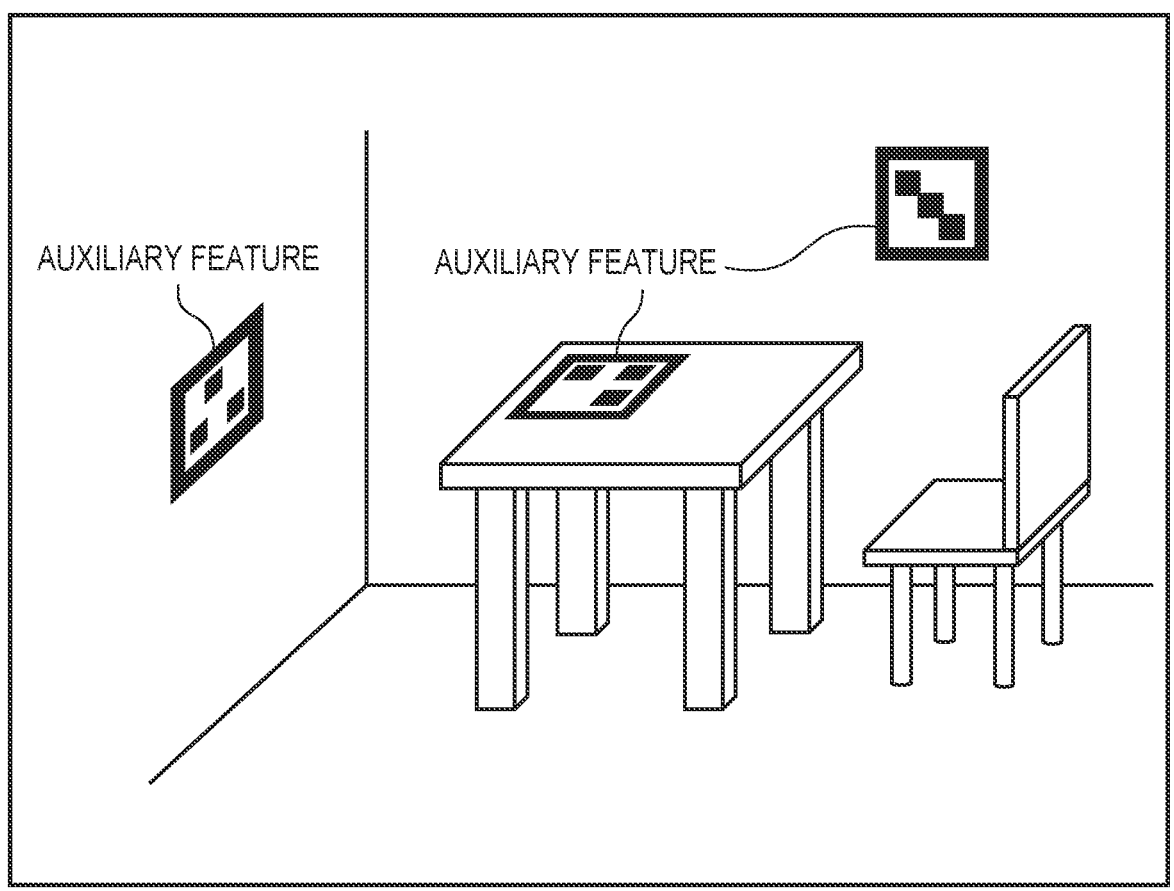
FIG. 3 is a view for explaining auxiliary features arranged in a real space.

The holding unit 110 holds arrangement information (the position and orientation of each auxiliary feature in the world coordinate system and the identifier of the auxiliary feature) of each auxiliary feature artificially arranged in the real space (scene), as shown in FIG. 3. In this embodiment, a monochrome square feature internally including an individual identifier, as shown in FIG. 3, is used as each auxiliary feature. With reference to a monochrome pattern at a predetermined position in the square, it is possible to specify the identifier of the square. The position and orientation of each auxiliary feature in the world coordinate system are calibrated in advance by, for example, a method disclosed in Japanese Patent No. 4532982 (or U.S. Pat. No. 7,529,387).

The holding unit 110 holds the three-dimensional map of the scene used by the first deriving unit 130. In this embodiment, similar to NPL 1, the three-dimensional map is held as a set of key frames.

Each key frame holds an image (grayscale image) I captured by the image capturing unit 170, a depth map D of the same image size as that of the captured image, and a variance map V. Each pixel in the depth map D holds a reciprocal (inverse depth) of a distance (depth value) from the image capturing unit 170 to a point corresponding to the pixel, that is, a reciprocal of the Z-coordinate of the corresponding point in the camera coordinate system. In this embodiment, similar to NPL 1, by setting, as a feature point, a pixel, among the pixels on the grayscale I, whose luminance gradient is larger than a threshold, the reciprocal of a depth value corresponding to the feature point is registered in the pixel at the position corresponding to the feature point in the depth map D. Each pixel in the variance map V holds the variance of the inverse depth.

Each key frame holds, as attributes, the position and orientation of the image capturing unit 170 in the world coordinate system at the time of capturing the captured image held in the key frame. The attributes (the position and orientation of the image capturing unit 170 in the world coordinate system) held in the key frame may be referred to as "the position and orientation of the key frame" hereinafter.

Each key frame can hold, as "a reference position and reference orientation", the position and orientation of the image capturing unit 170 in the world coordinate system, which are estimated based on the auxiliary features in the captured image held in the key frame.

In addition, each key frame can hold "key frame correspondence information" to be used for map optimization. The key frame correspondence information holds the identification number of each of two key frames forming a pair of key frames, and the relative position and orientation between the key frames. The key frame correspondence information is used for map optimization.

An update unit 140 updates the three-dimensional map held in the holding unit 110 based on the captured image and the position and orientation of the image capturing unit 170 derived by the first deriving unit 130.

A correction unit 150 corrects the three-dimensional map held in the holding unit 110 using the relative position and orientation between the key frames derived by the second deriving unit 160. This correction reduces the accumulated error in the three-dimensional map, thereby obtaining the geometrically consistent map.

The second deriving unit 160 performs processing of deriving the position and orientation of the image capturing unit 170 as the reference position and reference orientation based on the auxiliary features detected from the captured image input from the image input unit 120, and processing of deriving the relative position and orientation between the key frames. The derived relative position and orientation are used by the correction unit 150.

A control unit 199 controls the operation of the entire information processing apparatus 1. For example, the control unit 199 controls the operations of the functional units including the image input unit 120, the first deriving unit 130, the second deriving unit 160, the update unit 140, and the correction unit 150. The operation of the information processing apparatus 1 will be described next with reference to a flowchart shown in FIG. 4.

In step S1010, initialization processing of the three-dimensional map held in the holding unit 110 is performed. In the three-dimensional map initialization processing, the update unit 140 sets, as a reference image, the image captured by the first camera among stereo images (a set of the image captured by the first camera and the image captured by the second camera) input by the image input unit 120. The image captured by the first camera may be referred to as the first captured image hereinafter, and the image captured by the second camera may be referred to as the second captured image hereinafter. Then, the update unit 140 sets, as a feature point, a pixel whose luminance gradient is equal to or larger than a threshold on the reference image, and searches, by stereo matching, for a feature point corresponding to the feature point in the second captured image of the same set as that of the reference image. The update unit 140 calculates the inverse depth of the feature point in the camera coordinate system by triangulation using the feature point and the corresponding feature point. The update unit 140 registers the inverse depth of the calculated feature point in the pixel corresponding to the feature point in the depth map D. Furthermore, with respect to each pixel on the depth map D, the update unit 140 estimates the variance of the inverse depth calculated using the parallax of the left and right images (the first and second captured images), the base line length of the image capturing unit 170, and the variance of image noise, and saves it in the variance map V. The update unit 140 sets the reference image as the grayscale image I, generates a key frame including the grayscale image I, the depth map D, and the variance map V, and adds it to the three-dimensional map. Note that at this time, the position and orientation of the image capturing unit 170 in the world coordinate system at the time of capturing the grayscale image I may be registered in the three-dimensional map. Any method may be used to obtain the position and orientation of the image capturing unit 170 in the world coordinate system at the time of capturing the grayscale image I.

In step S1020, the image input unit 120 obtains the stereo image input from the image capturing unit 170. In step S1030, the first deriving unit 130 derives the position and orientation of the image capturing unit 170 in the world coordinate system using the stereo image input by the image input unit 120 in step S1020 and the three-dimensional map held in the holding unit 110. A method of deriving the position and orientation of the image capturing unit 170 using the stereo image and the three-dimensional map is well known. For example, the method disclosed in NPL 1 can be used.

In step S1040, based on the position and orientation of the image capturing unit 170 derived in step S1030, the update unit 140 updates the key frame held in the holding unit 110 or adds a new key frame to the holding unit 110. Details of the processing in step S1040 will be described later.

Processing in step S1050 is performed when a new key frame is added to the holding unit 110 in step S1040. In step S1050, the second deriving unit 160 derives the relative position and orientation between the key frames to be used for correction of the three-dimensional map. Details of the processing in step S1050 will be described later.

In step S1060, the correction unit 150 corrects the three-dimensional map using the relative position and orientation between the key frames obtained in step S1050. Since, if the depth map D held in the key frame is also corrected, it takes time to perform calculation, and thus only the position and orientation of the key frame in the world coordinate system are corrected in this embodiment. The position and orientation of the key frame in the world coordinate system are corrected using, as an evaluation function, the total sum of errors between the relative position and orientation calculated from the position and orientation of the key frame in the world coordinate system and the relative position and orientation between the key frames obtained in step S1050. Let M(i) and M(j) be 4×4 matrices representing the positions and orientations of key frames i and j in the world coordinate system, respectively, and $M_{rel}(i, j)$ be a 4×4 matrix representing the relative position and orientation between the key frames i and j. As given by the following expression, each of the matrices M(i), M(j), and $M_{rel}(i, j)$ is a matrix in which an upper left 3×3 matrix represents a rotation matrix R and the rightmost column is a matrix representing a translation component t.

$$\begin{bmatrix} R & t \\ 0 & 0 & 0 & 1 \end{bmatrix}$$

Assume that the matrices M(i) and M(j) are matrices each for transforming the position and orientation in the world coordinate system into a position and orientation in the camera coordinate system. Assume also that the matrix $M_{rel}(i, j)$ is a matrix for transforming the position and orientation of the key frame j in the camera coordinate system into a three-dimensional position of the key frame i in the camera coordinate system. In this example, the matrix $M_{rel}(i, j)$ is already known, and M(i) and M(j) are obtained to minimize expression (1) below.

$$\Sigma \| M(i) - M_{rel}(i,j) M(j) \|_F \quad (1)$$

Note that $\|matrix\|_F$ represents a Frobenius norm (the sum of squares of the elements of the matrix). Expression (1) indicates the total sum of all "the pieces of key frame corresponding information" saved in the three-dimensional map. Since each of M(i) and M(j) is nonlinear transformation, calculation is performed by, for example, the Gauss-Newton method that performs repeated calculation. The position and orientation derived in step S1030 are used as the initial values of the M(i) and M(j). The optimized M(i) and M(j) are saved as the attributes of the key frames in the three-dimensional map, and used as initial values when performing map optimization next.

Figure 4:
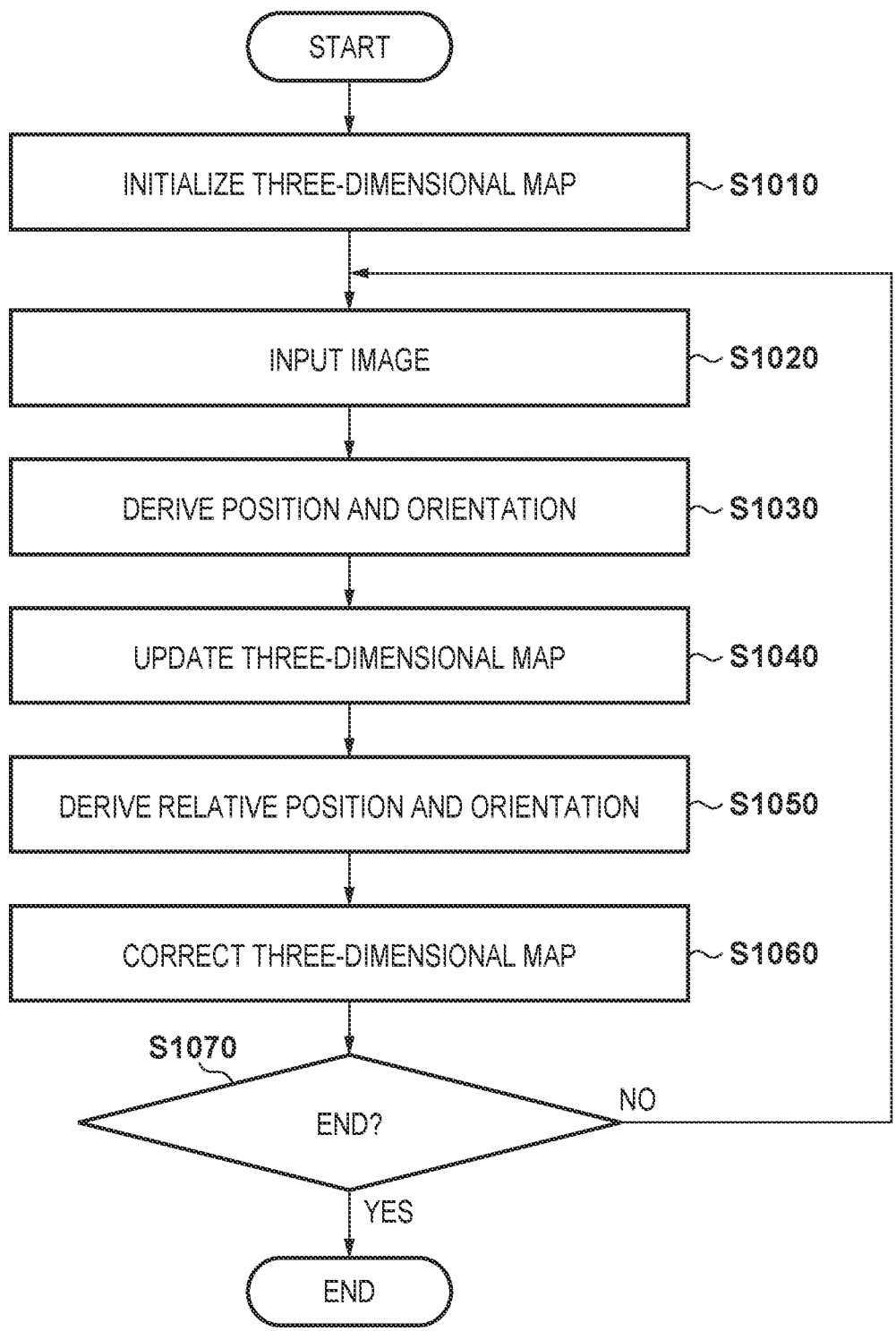
FIG. 4 is a flowchart of processing executed by an information processing apparatus 1.

In step S1070, the control unit 199 determines whether the end condition of the processing according to the flowchart shown in FIG. 4 is satisfied. Various conditions are considered as the end condition. For example, if the control unit 199 detects that the user operates an operation unit (not shown) to input "an end instruction of the processing according to the flowchart shown in FIG. 4", the control unit 199 determines that the end condition is satisfied. If the end condition is satisfied, the processing according to the flowchart shown in FIG. 4 is completed. On the other hand, if the end condition is not satisfied, the process returns to step S1020 via step S1070.

Details of the processing in step S1040 will be described next. In step S1040, based on the position and orientation of the image capturing unit 170 derived in step S1030, the update unit 140 updates the key frame held in the holding unit 110 or adds a new key frame to the holding unit 110.

For example, the update unit 140 specifies, as a nearest key frame, a key frame having, as attributes, a position and orientation closest to the position and orientation of the image capturing unit 170 derived in step S1030 among the key frames held in the holding unit 110. Then, the update unit 140 obtains feature points in the grayscale image I included in the nearest frame key, and also obtains feature points corresponding to the feature points in the first captured image input by the image input unit 120 in step S1020. The update unit 140 obtains a ratio Rin of the number of pixels of the corresponding feature points in the first captured image input by the image input unit 120 in step S1020 to the number of pixels of the featured points in the grayscale image included in the nearest key frame. If Rin is smaller than a threshold Tin, there is a small overlap with the nearest key frame, and thus the update unit 140 determines to add a key frame. On the other hand, if Rin is equal to or larger than the threshold Tin, there is a large overlap with the nearest key frame, and thus the update unit 140 determines not to add a key frame (to update the key frame held in the holding unit 110).

If it is determined to add a key frame, the update unit 140 adds a new key frame to the three-dimensional map by performing the following processing. First, the update unit 140 calculates the inverse depth of each feature point in the camera coordinate system by performing the processing described in step S1010 using the stereo image input by the image input unit 120 in step S1020. The update unit 140 generates a new depth map D by updating, by the calculated inverse depth, the inverse depth propagated from the existing key frame (the key frame registered (registered in the past) in the three-dimensional map). Furthermore, the update unit 140 generates a variance map V using the variance of the inverse depth held in the existing key frame and the variance of the newly calculated inverse depth. Then, the update unit 140 sets, as the grayscale image I, the first captured image input by the image input unit 120 in step S1020, generates a key frame including the depth map D and the variance map V generated in step S1040 and including, as attributes, the position and orientation of the image capturing unit 170 derived in step S1030, and adds the generated key frame to the three-dimensional map.

On the other hand, if it is determined not to add a key frame, the update unit 140 updates the key frame held in the holding unit 110 by performing the following processing. More specifically, the update unit 140 updates the depth map D and the variance map V of the existing key frame using the position and orientation derived by the first deriving unit 130 in step S1030 and the stereo image input in step S1020. Similar to the method disclosed in NPL 1, the depth map D and the variance map V are updated using the inverse depth estimated from the stereo image and the inverse depth estimated from motion stereo with the grayscale image held in the key frame.

Figure 5:
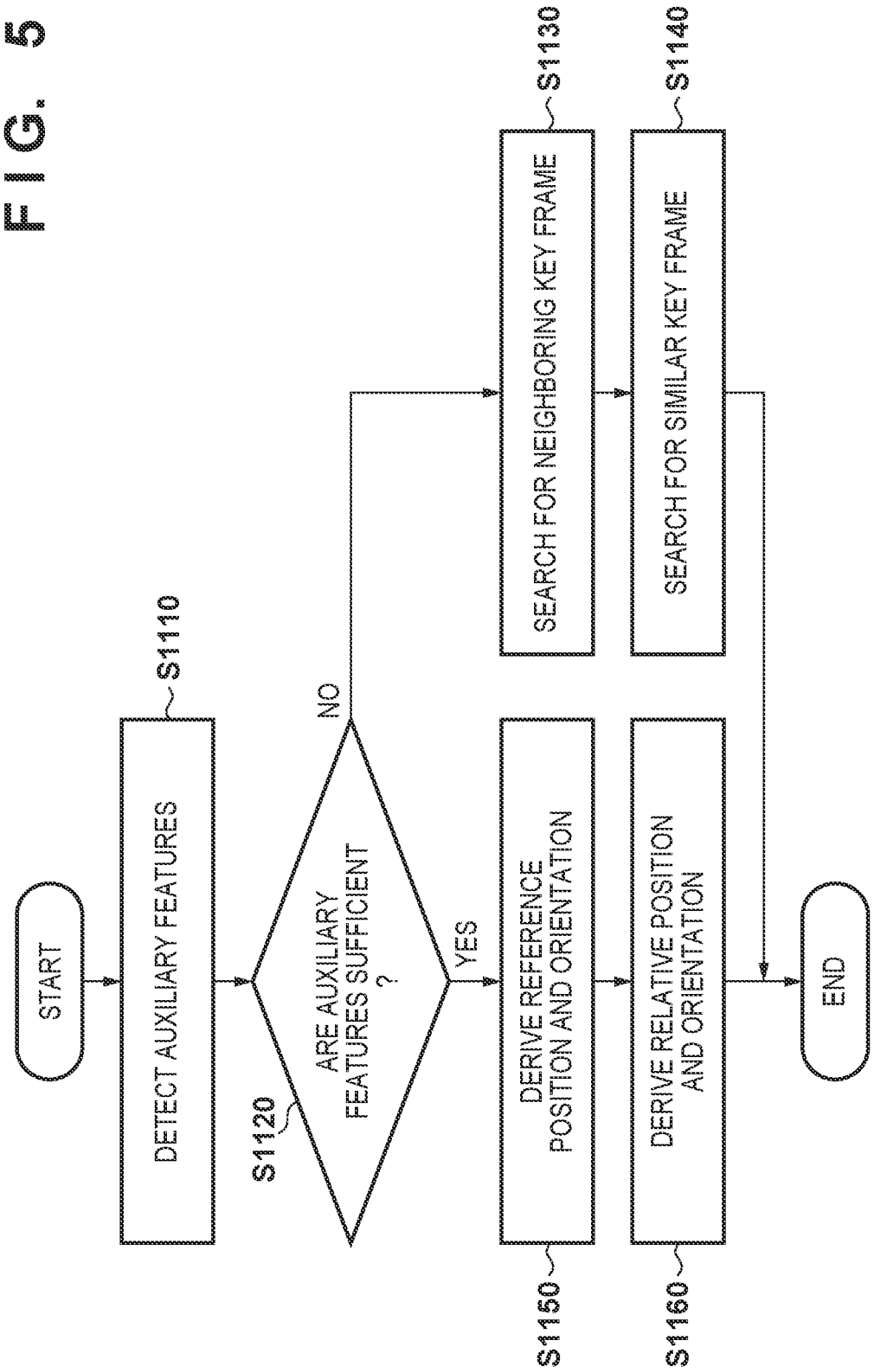
FIG. 5 is a flowchart of processing in step S1050.

Details of the processing in step S1050 will be described next with reference to a flowchart shown in FIG. 5. In step S1110, the second deriving unit 160 detects, for each of the first and second captured images, the auxiliary features from the captured image. The auxiliary features shown in FIG. 3 are detected as follows. First, the captured image is binarized to generate a binary image, each rectangular region is detected from the binary image, and projective transformation from a square into image coordinates is calculated based on the image coordinates of each vertex of the rectangular region, thereby transforming the rectangular region into a square. Then, the identifier of each auxiliary feature is specified by reading out, from the image, a luminance value corresponding to a predetermined position in the square. At this time, the specified identifier is collated with the identifier of the auxiliary feature held in the holding unit 110. If the identifiers match, the correspondence between the three-dimensional coordinates in the world coordinate system and the image coordinates of each vertex is saved. The three-dimensional coordinates of the vertex of each auxiliary feature in the world coordinate system are calculated from the three-dimensional coordinates of the vertex in the coordinate system defined by the auxiliary feature and the position and orientation of the auxiliary feature in the world coordinate system.

In step S1120, the second deriving unit 160 determines whether information obtained from the auxiliary features is sufficient. In this example, whether information of the auxiliary features is sufficient is determined using the distribution, on the image, of the vertices of the auxiliary features whose correspondence is saved in step S1110. More specifically, for each of the first and second captured images, the covariance matrix of the image coordinates of the vertices of the auxiliary features is calculated. If a condition that one of minimum eigenvalues Eig(L) and Eig(R) of the covariance matrices calculated from the first and second captured images is smaller than a threshold T_Eig is satisfied, it is determined that the information of the auxiliary features is insufficient, and the process advances to step S1130. On the other hand, if this condition is not satisfied, the process advances to step S1150.

In step S1130, the second deriving unit 160 specifies, from the existing key frame group held in the holding unit 110, the key frame having, as attributes, the position and orientation close to the position and orientation (attributes) of the key frame (added key frame) newly added in step S1040. More specifically, with respect to the added key frame, among the existing key frames whose angle difference in the visual axis direction (the Z-axis of the camera coordinate system) in the world coordinate system is equal to or smaller than a threshold TAngle (threshold), all the existing key frames each having a positional difference equal to or smaller than a threshold TDist in the world coordinate system are specified. The second deriving unit 160 calculates the relative position and orientation between each of the specified existing key frames and the added key frame (second acquisition processing), and registers, in the holding unit 110, the calculated relative position and orientation, the identification number of each existing key frame, and the identification number of the added key frame as key frame correspondence information of the added key frame.

In step S1140, the second deriving unit 160 specifies, from the holding unit 110, the existing key frame including the grayscale image I whose similarity with the grayscale image I included in the added key frame is high, and derives the relative position and orientation with respect to the specified existing key frame. More specifically, the second deriving unit 160 generates a reduced image I' of the grayscale image I included in each of the added key frame and the existing key frame. Then, the second deriving unit 160 specifies the existing key frames for each of which the SSD (Sum of Squared Distance) of the luminance values of the reduced images I' between the added key frame and the existing key frame is smallest and equal to or smaller than a threshold TSSD. The second deriving unit 160 calculates the relative position and orientation between each of the specified existing key frames and the added key frame in the same manner (second acquisition processing). The second deriving unit 160 registers, in the holding unit 110, the calculated relative position and orientation, the identification number of each existing key frame, and the identification number of the added key frame as key frame correspondence information of the added key frame.

On the other hand, in step S1150, the second deriving unit 160 calculates the reference position and reference orientation of the added key frame based on the correspondence between the three-dimensional coordinates in the world coordinate system and the image coordinates of each vertex of each auxiliary feature obtained in step S1110, and registers them in the added key frame. Calculation of the registration position and registration orientation is performed by, for example, a method by Lepetit, et al. (V. Lepetit, F. Moreno-Noguer, and P. Fua, "EPnP: an accurate O(n) solution to the PnP problem," International Journal of Computer Vision, vol. 81, no. 2, pp. 155-166, 2009).

In step S1160, the second deriving unit 160 calculates the relative position and orientation between the added key frame and the existing key frame holding the reference position and reference orientation (second acquisition processing). Let $M_{new}$ be a 4×4 matrix representing the reference position and reference orientation of the added key frame, and $M_{old}$ be a 4×4 matrix representing the reference position and reference orientation of the existing key frame (the matrices $M_{new}$ and $M_{old}$ are matrices for transforming the position and orientation in the world coordinate system into a position and orientation in the camera coordinate system). At this time, $M_{rel}$(new, old) representing the relative position and orientation between the key frames is calculated by equation (2) below.

$$M_{rel}(\text{new,old})=M_{new}(M_{old})^{-1} \qquad (2)$$

If there are a plurality of existing key frames each holding the reference position and reference orientation, among the existing key frames that exist before the added key frame and are away by a predetermined distance or more, the existing key frame for which an angle between the visual axis directions (the Z-axis of the camera coordinate system) of the key frames is largest is selected. This aims at more reducing the accumulated error by correction of the three-dimensional map by pairing the key frames having different viewpoints as much as possible. The relative position and orientation of the selected pair and the identification number of each key frame of the selected pair are registered in the holding unit 110 as key frame correspondence information in the added key frame.

As described above, according to this embodiment, even if the moving range of the camera is limited, it is possible to create an accurate three-dimensional map by using, for correction of the three-dimensional map, the relative position and orientation between the key frames derived using the auxiliary features arranged in the scene.

<Modification>

In the first embodiment, the image capturing unit 170 has been explained as a stereo camera. However, any apparatus other than the stereo camera may be used as the image capturing unit 170 as long as the apparatus can capture an image from which the auxiliary features arranged in the scene can be detected. For example, the image capturing unit 170 may be a monocular camera or may include three or more cameras which are rigidly fixed and for which the relative position and orientation among the cameras are known. Alternatively, the image capturing unit 170 may be an RGBD camera that captures a color image and a distance image.

Furthermore, the shape of each auxiliary feature is not limited to the rectangle, and any feature as long as it can stably be detected from an image may be used. For example, a triangular, hexagonal, circular, or elliptical auxiliary feature may be used. The identifier of the auxiliary feature need not be specified from an image. For example, if a circular auxiliary feature is used, the position of the auxiliary feature on the image may be calculated based on the position and orientation of the image capturing unit 170 derived by the first deriving unit 130, and associated with an auxiliary feature detected nearby, thereby specifying the identifier of the auxiliary feature. An auxiliary feature with an identifier and that with no identifier may be used together. In this case, the position of the auxiliary feature with no identifier on the image may be calculated based on the position and orientation of the image capturing unit 170 calculated from the auxiliary feature with the identifier, and associated with an auxiliary feature detected nearby.

In addition, calibration of the arrangement information of each auxiliary feature need not always be performed in advance. For example, calibration may be performed using the image captured by the image capturing unit 170 simultaneously with creation of the three-dimensional map of the scene. At this time, correction of the three-dimensional map using the auxiliary features is performed when the reliability of the arrangement information of each auxiliary feature is sufficiently high (for example, the reliability is equal to or larger than a threshold), instead of performing correction at all times, thereby preventing the accuracy of the three-dimensional map from deteriorating. The reliability of the arrangement information of each auxiliary feature is determined based on, for example, the average value or minimum value of the numbers of times each auxiliary feature is detected in the image group used for calibration. As the average value or minimum value of the numbers of times of detection is larger, the reliability is higher.

Furthermore, the criterion of determination of whether the information of each auxiliary features is sufficient is not limited to the distribution of the auxiliary features on the image. For example, if the number of auxiliary features detected on the image is equal to or larger than a threshold, it may be determined that the information of the auxiliary features is sufficient. Alternatively, the determination processing may be performed based on a combination of the number of auxiliary features and the distribution of the auxiliary features on the image.

When specifying, from the key frames each holding the reference position and reference orientation, the key frame to be used to calculate the relative position and orientation, only the key frames among which a common auxiliary feature is observed may be targeted.

Second Embodiment

In embodiments and modifications to be described below including this embodiment, differences from the first embodiment will be described, and the remaining is assumed to be similar to the first embodiment unless it is specifically stated otherwise. This embodiment will describe a case in which a sensor that measures a position and orientation is mounted on an image capturing unit 170 and the measured values of this sensor are used for correction of a three-dimensional map.

Figure 6:
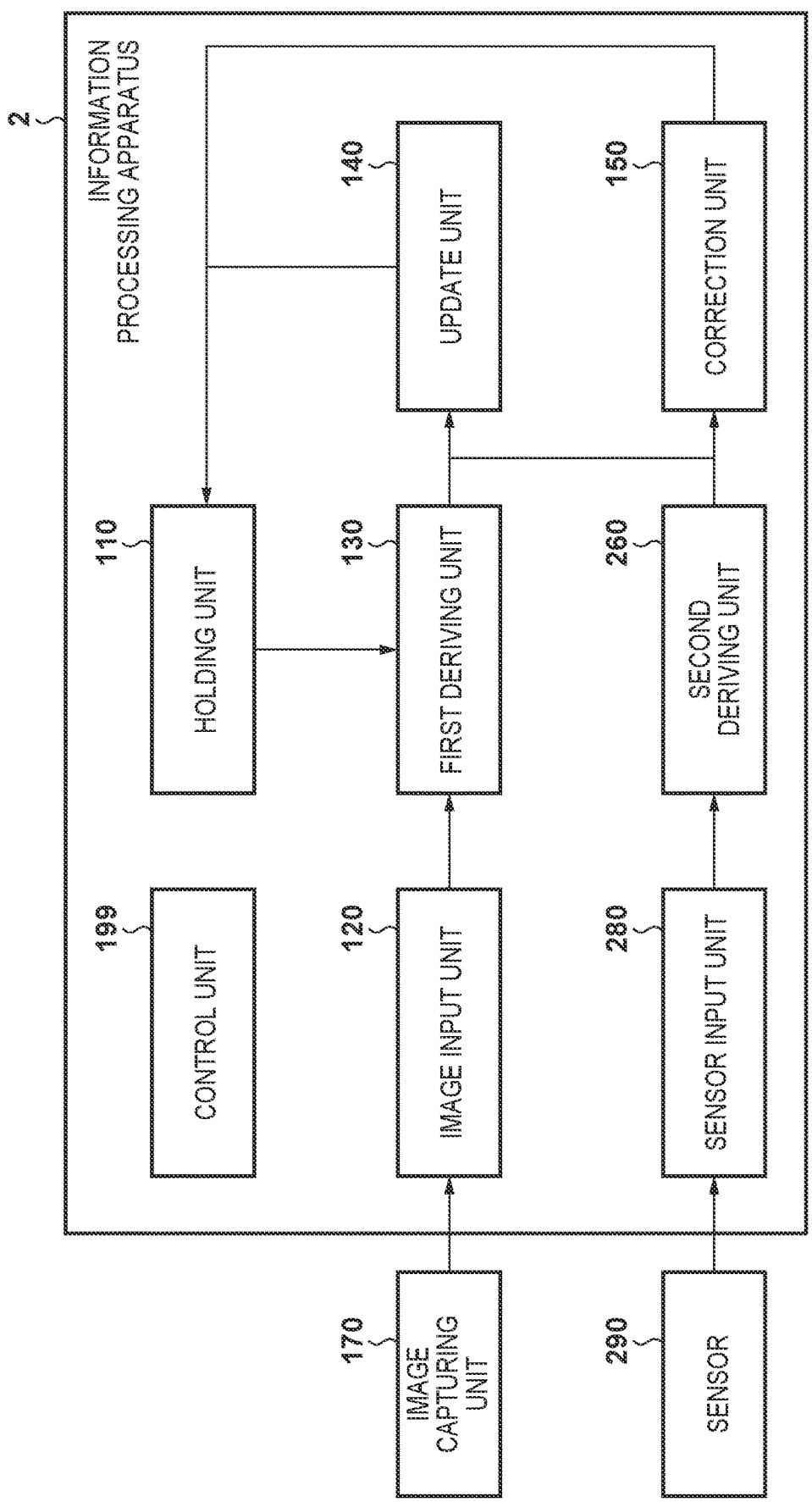
FIG. 6 is a block diagram showing an example of the functional arrangement of a system.

An example of the functional arrangement of a system according to this embodiment will be described with reference to a block diagram shown in FIG. 6. Referring to FIG. 6, the same reference numerals as those in FIG. 2 denote similar functional units and a description thereof will be omitted. As shown in FIG. 6, the system according to this embodiment includes the image capturing unit 170, a sensor 290, and an information processing apparatus 2.

The sensor 290 will first be described. The sensor 290 measures the position and orientation of the image capturing unit 170 in the world coordinate system, and outputs the measured values to the information processing apparatus 2. In this embodiment, the sensor 290 is assumed to be an optical position and orientation sensor disclosed in a literature by Bauer, et al. (M. Bauer, M. Schlegel, D. Pustka, N. Navab, and G. Klinker, "Predicting and estimating the accuracy of n-occular optical tracking systems," Proc. 5th IEEE and ACM International Symposium on Mixed and Augmented Reality, pp. 43-51, 2006). This optical position and orientation sensor measures the position and orientation of a measurement target (in this embodiment, the image capturing unit 170) in the world coordinate system by arranging a plurality of markers on the measurement target and using images obtained by capturing the arranged markers by a plurality of cameras fixed in a scene.

Next, the information processing apparatus 2 will be described. A sensor input unit 280 inputs the measured values output from the sensor 290, and sends the measured values to a second deriving unit 260 of the succeeding stage. The second deriving unit 260 performs processing of deriving the position and orientation of the image capturing unit 170 as a reference position and reference orientation based on the measured values, and processing of deriving the relative position and orientation between key frames. The derived relative position and orientation are used by a correction unit 150.

Figure 7:
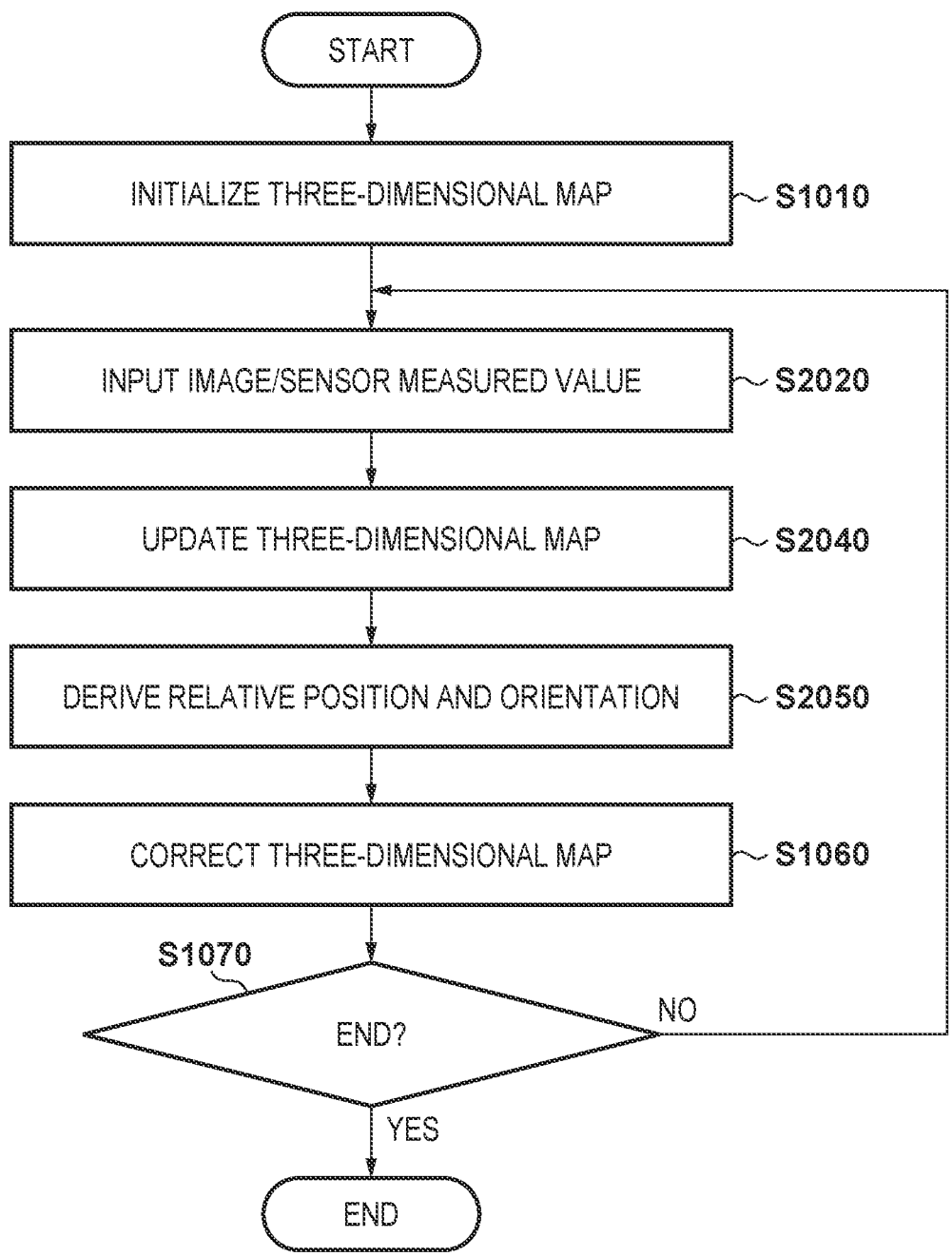
FIG. 7 is a flowchart of processing executed by an information processing apparatus 2.

The operation of the information processing apparatus 2 will be explained next with reference to a flowchart shown in FIG. 7. Referring to FIG. 7, the same steps numbers as those in FIG. 4 denote the same processing steps, and a description thereof will be omitted.

In step S2020, an image input unit 120 acquires a stereo image input from the image capturing unit 170, and the sensor input unit 280 acquires the measured values (the position and orientation of the image capturing unit 170 in the world coordinate system) input from the sensor 290.

In step S2040, an update unit 140 adds a new key frame to the three-dimensional map, similar to step S1040 described above. As the attributes of the added key frame, that is, the reference position and reference orientation, the position and orientation of the image capturing unit 170 acquired in step S2020 are applied.

In step S2050, the second deriving unit 260 uses, as the reference position and reference orientation in the added key frame, the position and orientation represented by the measured values acquired in step S2020. Similar to step S1160 described above, the second deriving unit 260 calculates the relative position and orientation between the added key frame and each existing key frame holding the reference position and reference orientation. Then, the second deriving unit 260 selects, from the existing key frames each holding the reference position and reference orientation, the existing key frame whose distance from the added key frame is longest, and registers, in the added key frame, as key frame correspondence information, the relative position and orientation with respect to the selected existing key frame, the identification number of the selected existing key frame, and the identification number of the added key frame.

As described above, according to this embodiment, even if the moving range of the camera is limited, it is possible to reduce an error accumulated in the three-dimensional map by deriving the relative position and orientation between the key frames based on the measured values of the sensor that measures the position and orientation.

<Modification>

The sensor 290 is not limited to the optical position and orientation sensor, and may be a position and orientation sensor of another type. For example, a magnetic position and orientation sensor may be used. In addition, it is not necessary to measure both the position and orientation, and a sensor that measures one of a position and orientation may be adopted. That is, an orientation sensor that measures the orientation of the image capturing unit 170 using a gyroscope, an acceleration sensor, or a magnetic sensor, or a position sensor that measures a position, such as a GPS, may be used. If a sensor that measures one of a position and an orientation is used, a relative position or orientation is acquired, and the three-dimensional map is corrected (only a component measured by the sensor is corrected) based on the relative position or orientation. Alternatively, a sensor that measures a position and a sensor that measures an orientation may be used in combination as a position and orientation sensor.

Any apparatus other than a stereo camera may be used as the image capturing unit 170 as long as the apparatus can capture an image that can be used to create the three-dimensional map of the scene. For example, the image capturing unit 170 may be a monocular camera or may include three or more cameras which are rigidly fixed and for which the relative position and orientation among the cameras are known. Alternatively, the image capturing unit 170 may be a depth camera that captures a distance image or an RGBD camera that captures a color image and a distance image.

Third Embodiment

Figure 8:
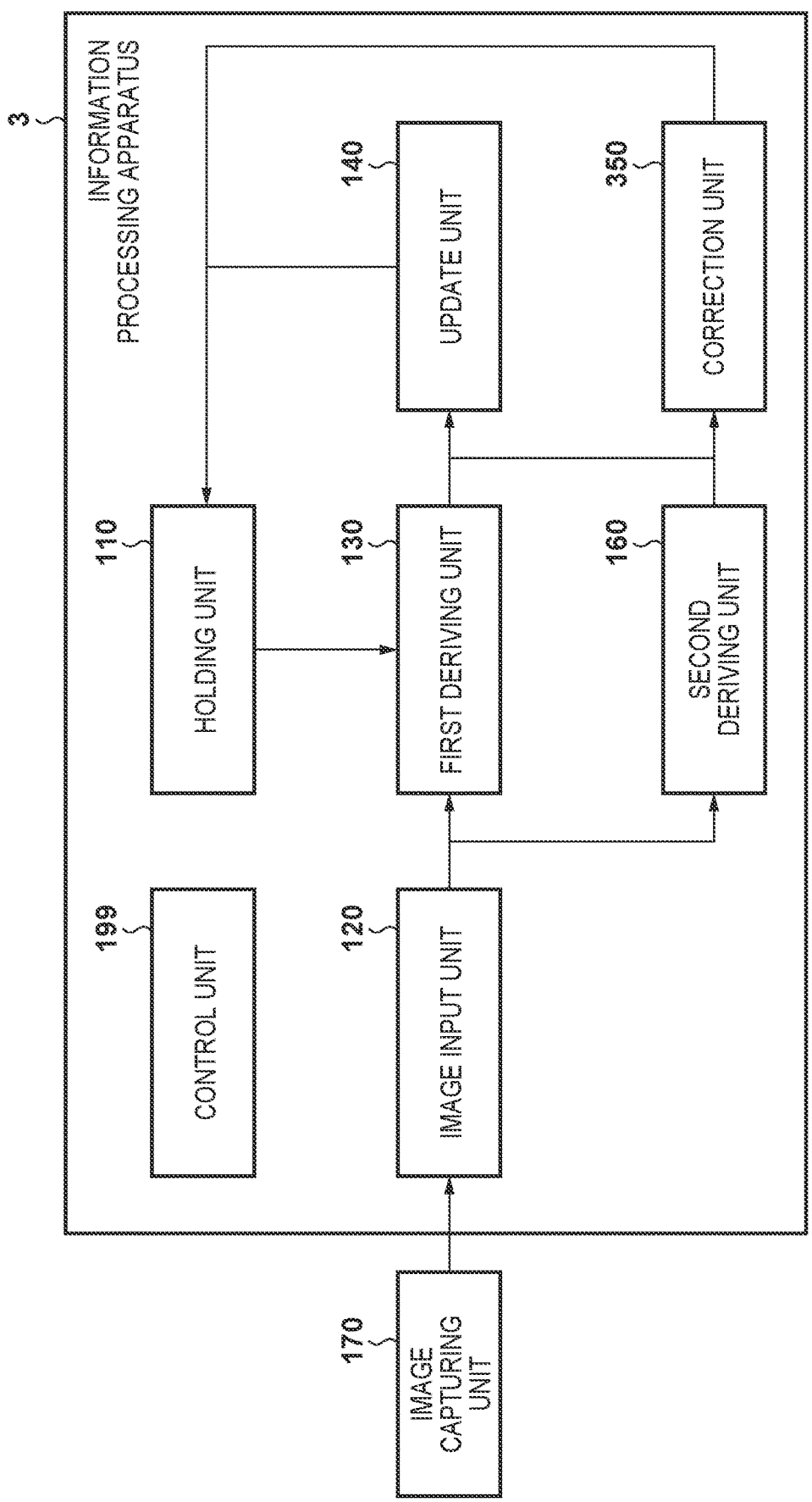
FIG. 8 is a block diagram showing an example of the functional arrangement of a system.

In this embodiment, in addition to correction of the position and orientation of each key frame in map optimization like in NPL 1, the three-dimensional coordinates of each feature point are corrected. An example of the functional arrangement of a system according to this embodiment will be described with reference to a block diagram shown in FIG. 8. Referring to FIG. 8, the same reference numerals as those in FIG. 2 denote similar functional units, and a description thereof will be omitted. As shown in FIG. 8, the system according to this embodiment includes an image capturing unit 170 and an information processing apparatus 3.

A correction unit 350 corrects a three-dimensional map using the relative position and orientation between key frames, which are derived by a second deriving unit 160. The correction unit 150 according to the first embodiment corrects only the position and orientation of the key frame to reduce the calculation time, and the accuracy of the three-dimensional map is thus low. On the other hand, in this embodiment, the accuracy of the three-dimensional map is improved by correcting a depth map held in each key frame together with the position and orientation of the key frame by taking calculation time.

Figure 9:
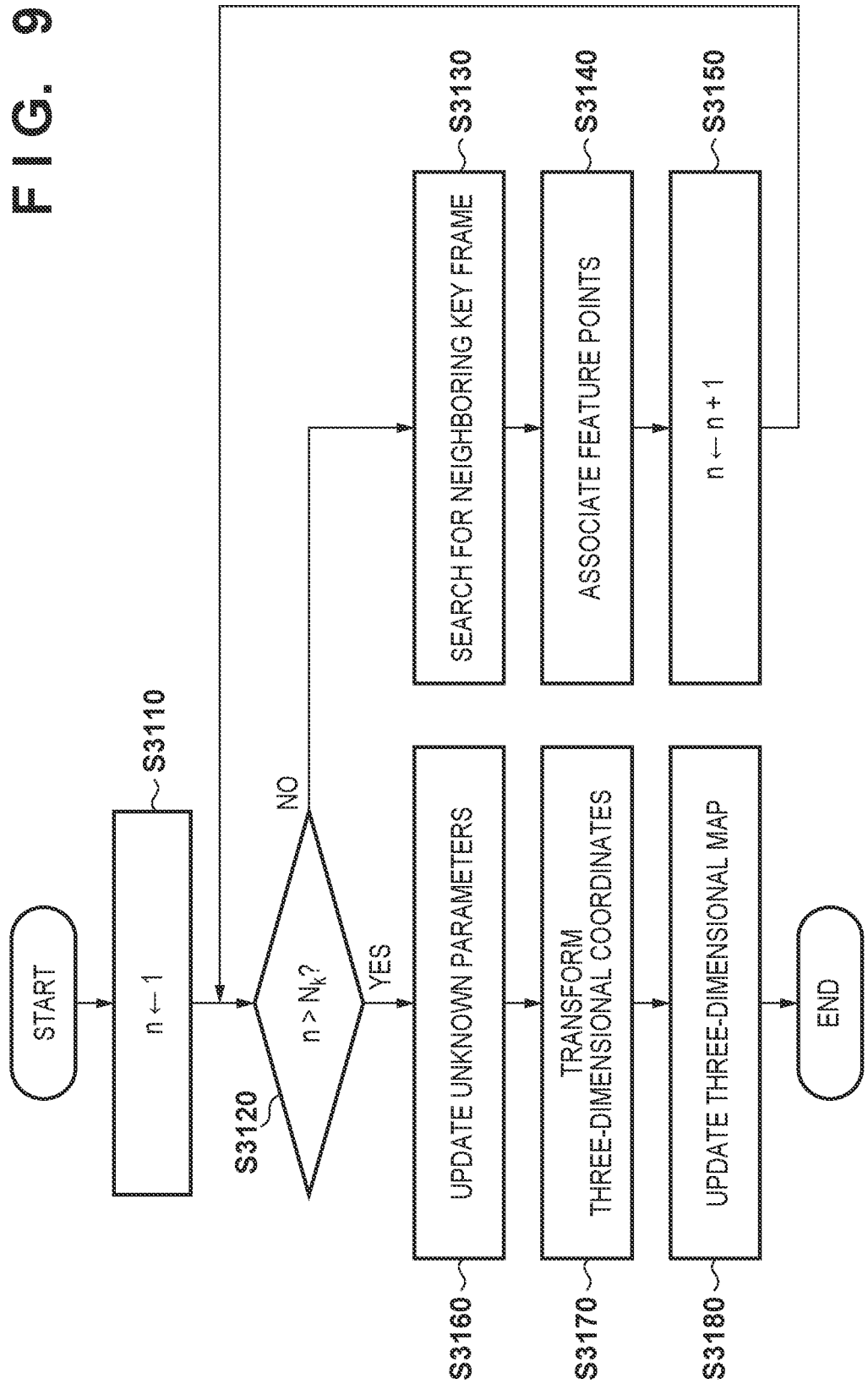
FIG. 9 is a flowchart of processing in step S1060.

The operation of the information processing apparatus 3 will be described next with reference to the flowchart shown in FIG. 4. The information processing apparatus 3 executes processing obtained by replacing the processing in step S1060 in the processing according to the flowchart shown in FIG. 4 by processing according to a flowchart shown in FIG. 9.

In step S1060 according to this embodiment, the correction unit 350 corrects the three-dimensional map using, as a constraint, the relative position and orientation between the key frames obtained in step S1050. In correction of the three-dimensional map, the position and orientation of each key frame and the three-dimensional coordinates of each feature point are corrected using, as an evaluation function, the sum of (1) the total sum of reprojection errors of feature points in each key frame and (2) the total sum (expression (1)) of the errors of the relative position and orientation between the key frames.

In step S1060 according to this embodiment, feature points held by each key frame in the depth map are respectively associated with feature points held by another key frame in the depth map. Next, the three-dimensional map is corrected using the result of association of the feature points and the relative position and orientation between the key frames. Let Nk be the total number of key frames held in the three-dimensional map (that is, the identification numbers of the key frames are 1 to Nk).

In step S3110, the correction unit 350 initializes the value of a variable n to 1. In step S3120, the correction unit 350 determines whether n>Nk holds. If, as a result of the determination, n>Nk holds, it is determined that the feature points in all the key frames have been associated with each other, and the process advances to step S3160; otherwise, the process advances to step S3130.

In step S3130, the correction unit 350 performs processing similar to that in step S1130 to specify, from an existing key frame group held in the holding unit 110, a key frame having a position and orientation close to the position and orientation of a key frame n (a key frame having an identification number of n). Furthermore, the correction unit 350 performs processing similar to that in step S1140 to specify, from the holding unit 110, an existing key frame including a grayscale image I with high similarity with a grayscale image I included in the key frame n.

In step S3140, the correction unit 350 associates feature points in the key frame n with feature points in the key frame (specified key frame) specified in step S3130. The association result is used in parameter update processing in step S3160 to update the three-dimensional coordinates of each feature point as common parameters between the key frames instead of updating them for each key frame. The feature points are associated with each other, as follows. First, a position (un, vn) corresponding to each feature point in the key frame n is calculated in the specified key frame using the position and orientation of each key frame in the world coordinate system, the three-dimensional coordinates of each feature point calculated from the depth map, and the intrinsic parameters of the image capturing unit 170. Among the feature points in the specified key frame, feature points each existing at a position where the distance from the position (un, vn) is equal to or shorter than a threshold $T_{neighbour}$ are selected. With respect to the feature points in the key frame n, if, among the selected feature points, there are feature points for each of which the total sum of squared errors of the luminance values of N×N pixels close to the feature point is equal to or smaller than a threshold Tdiff, the feature point whose total sum of squared errors is smallest is associated with the feature point in the key frame n, and the same identification number is assigned to them. In step S3150, the correction unit 350 increments the value of the variable n by one. The process then returns to step S3120.

On the other hand, in step S3160, the correction unit 350 updates "the position and orientation of each key frame in the world coordinate system" and "the three-dimensional coordinates of each feature point" as unknown parameters. As described above, the unknown parameters are estimated so that the sum of (1) the total sum of reprojection errors of the feature points in each key frame forming the three-dimensional map and (2) the total sum of the errors of the relative position and orientation between the key frames is smallest. The reprojection error indicates the difference between the actual detected position ($u_{obs}$, $v_{obs}$) of each feature point on the image and a position ($u_{calc}$, $v_{calc}$) on the image calculated based on the position and orientation of each key frame, the three-dimensional coordinates of each feature point, and the intrinsic parameters of the image capturing unit 170. A total sum $E_{reproj}$ of the reprojection errors is given by equation (3) below.

$$E_{reproj} = \sum_{i=1}^{N_s} \sum_{j} \{(u_{calc}(i,j) - u_{obs}(i,j))^2 + (v_{calc}(i,j) - v_{obs}(i,j))^2\} \quad (3)$$

Assume that ($u_{calc}(i, j)$, $v_{calc}(i, j)$) represents the calculated position, on the image, of the jth feature point in the ith key frame. Assume also that ($u_{obs}(i, j)$, $v_{obs}(i, j)$) represents the detected position, on the image, of the jth feature point in the ith key frame. A total sum $E_{relative}$ of the errors of the relative position and orientation between the key frames is given by equation (4) below.

$$E_{relative} = \Sigma \|M(s) - M_{rel}(s,t)M(t)\|_F \quad (4)$$

In equation (4), M(s) and M(t) represent 4×4 rigid body transformation matrices indicating the positions and orientations of key frames s and t in the world coordinate system, respectively, and $M_{rel}(s, t)$ represents a 4×4 matrix indicating the relative position and orientation between the key frames s and t, and is obtained in step S1050. In step S3160, the unknown parameters are estimated so that a weighted sum $E_{total}$ of equations (3) and (4) given by equation (5) below is smallest.

$$E_{total} = E_{reproj} + wE_{relative} \quad (5)$$

Estimation of the unknown parameters that minimize equation (5) is performed by bundle adjustment. However, bundle adjustment is generally a method of minimizing the reprojection errors. Therefore, estimation is performed by combining bundle adjustment with a method (I. Skrypnyk and D. G. Lowe, "Scene modelling, recognition and tracking with invariant image features," Proc. 3rd IEEE and ACM International Symposium on Mixed and Augmented Reality, pp. 110-119, 2004), by Skrypnyk, et al., of estimating a position and orientation so that the sum of reprojection errors and differences in position and orientation between key frames is smallest.

In step S3170, the correction unit 350 transforms the three-dimensional coordinates of each feature point in the world coordinate system, which have been estimated in step S3160, into three-dimensional coordinates of each key frame in the camera coordinate system, and transforms the Z component of the transformed three-dimensional coordinates into an inverse depth.

In step S3180, the correction unit 350 updates the position and orientation of each key frame by the position and orientation of each key frame in the world coordinate system, which have been estimated in step S3160. Furthermore, the correction unit 350 updates the inverse depth of each feature point in the depth map D included in each key frame by the inverse depth of the feature point transformed in step S3170.

As described above, according to this embodiment, it is possible to improve the accuracy of the three-dimensional map by correcting the three-dimensional coordinates of each feature point in addition to the position and orientation of each key frame using the relative position and orientation between the key frames obtained from auxiliary features arranged in a scene.

<Modification>

A method of holding the three-dimensional map is not limited to a method in which each key frame holds the depth map D. For example, one depth map may be held in a three-dimensional map like a method by Klein, et al. (G. Klein and D. Murray, "Parallel Tracking and Mapping for Small AR Workspaces," Proc. 6th IEEE and ACM International Symposium on Mixed and Augmented Reality, pp. 225-234, 2007).

In addition, the relative position and orientation between the key frames need not always be derived from the auxiliary features arranged in the scene, and may be acquired from a sensor that measures the position or orientation of an image capturing apparatus like in the second embodiment.

Fourth Embodiment

Although the functional units shown in FIG. 2, 6, or 8 may be implemented by hardware, the functional units except for a holding unit 110 may be implemented by software (computer programs). In the latter case, a computer apparatus that includes a memory functioning as the holding unit 110 and can execute the computer programs is applicable to the information processing apparatus according to each of the above-described embodiments and modifications. An example of the hardware arrangement of the computer apparatus applicable to the information processing apparatus according to each of the above-described embodiments and modifications will be described with reference to a block diagram shown in FIG. 1.

A CPU 10 executes processing using a computer program and data stored in a ROM 20 or a RAM 30. The CPU 10 thus controls the operation of the entire computer apparatus, and executes or controls each processing described above as processing to be performed by the information processing apparatus. The ROM 20 stores setting data of the computer apparatus and various kinds of basic programs.

The RAM 30 has an area to store a computer program and data loaded from an external storage device 70, and data received from the outside (an image capturing unit 170 or a sensor 290) via an input I/F (interface) 40. The RAM 30 further has a work area used by the CPU 10 to execute various kinds of processes. In this way, the RAM 30 can appropriately provide various kinds of areas.

The input I/F 40 functions as an I/F for receiving an input from the outside. For example, a captured image or a measured value output from the image capturing unit 170 or the sensor 290 is received via the input I/F 40.

A display unit 60 is formed by a CRT or a liquid crystal screen, and can display the processing result of the CPU 10 by an image or characters. The display unit 60 may be a touch panel screen.

The external storage device 70 is a mass information storage device represented by a hard disk drive. An OS (Operating System) and computer programs and data configured to cause the CPU 10 to execute the processes described above as processes to be performed by the information processing apparatus are saved in the external storage device 70. The computer programs saved in the external storage device 70 include computer programs configured to cause the CPU 10 to implement the functions of the functional units except for the holding unit 110 in FIG. 2, 6, or 8. In addition, the data saved in the external storage device 70 include data described as known information (for example, thresholds and various kinds of parameters) in the above explanation. The computer programs and data saved in the external storage device 70 are appropriately loaded into the RAM 30 under the control of the CPU 10 and processed by the CPU 10. Note that the units described as the holding unit 110 and the memory (not shown) can be implemented by the ROM 20 or the RAM 30 and the external storage device 70.

An operation unit 80 is formed by a user interface such as a keyboard or a mouse, and the user can input various kinds of instructions to the CPU 10 by operating the operation unit 80. For example, the user can input an end instruction of the processing shown in FIG. 4 or 7 by operating the operation unit 80.

Figure 1:
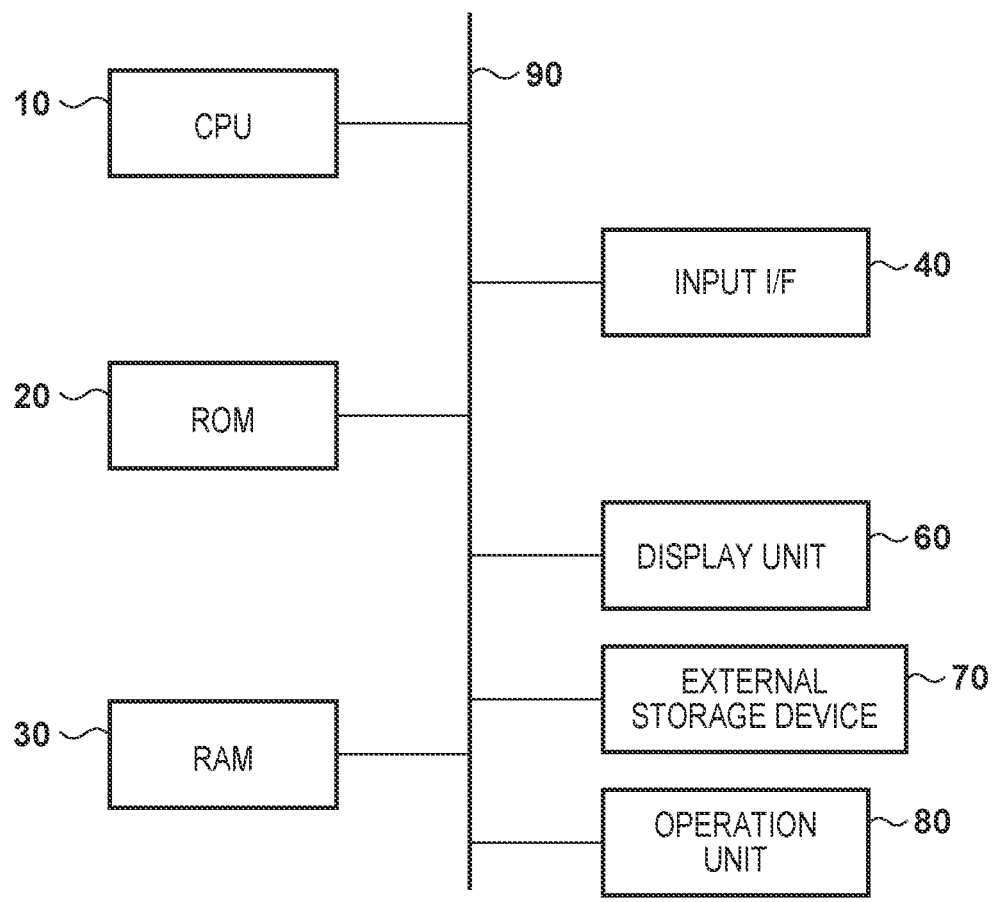
FIG. 1 is a block diagram showing an example of the hardware arrangement of a computer apparatus.

All the CPU 10, the ROM 20, the RAM 30, the input I/F 40, the display unit 60, the external storage device 70, and the operation unit 80 are connected to a bus 90. Note that the hardware arrangement shown in FIG. 1 is merely an example of the hardware arrangement applicable to the above-described information processing apparatus.

Fifth Embodiment

Figure 10:
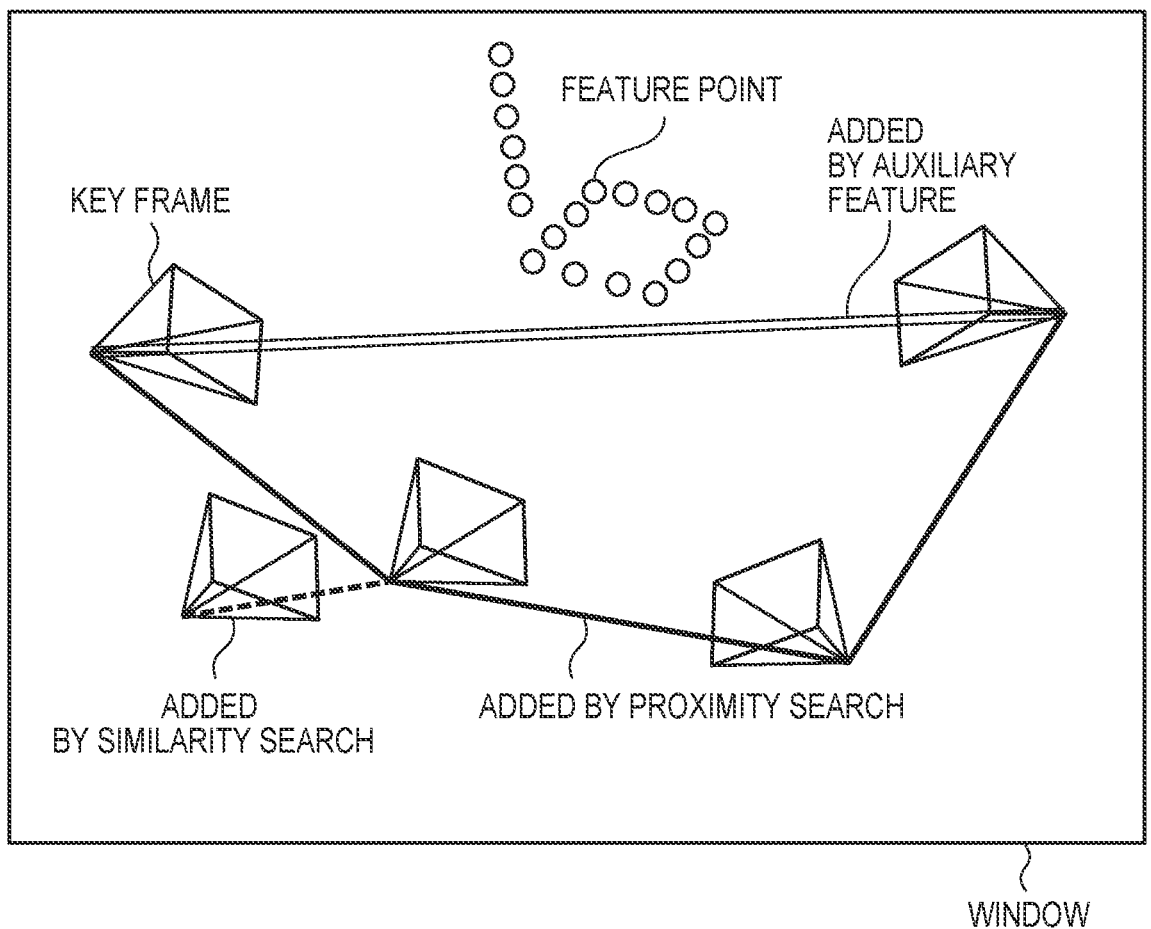
FIG. 10 is a view showing an example of a GUI (window).

This embodiment will describe a GUI (Graphical User Interface) applicable to each of the above-described embodiments. For example, FIG. 10 shows an example of a GUI (window) that presents an image (virtual space image) obtained by constructing a virtual space based on a three-dimensional map corrected according to the flowchart shown in FIG. 4 and viewing the virtual space from an arbitrary viewpoint (virtual camera). This GUI is displayed on, for example, a display unit 60.

In this GUI, in addition to the virtual space image of the virtual space seen from the virtual camera, feature points (displayed at positions where the three-dimensional coordinates of the feature points are projected onto the screen) and objects representing the positions and orientations of key frames are drawn. In this embodiment, each feature point is represented by a circular point and each object indicating a key frame is represented by a cone imitating a camera. The user can change the position and orientation, intrinsic parameters, and the like of the virtual camera by operating the operation unit 80, and observe and confirm the virtual space corresponding to the created three-dimensional map from various viewpoints. If key frame correspondence information exists in the three-dimensional map, it is possible to confirm key frames used for correction of the three-dimensional map by connecting, by a line segment, vertices (objects) of cones representing corresponding key frames. At this time, whether auxiliary features are effectively used can be confirmed by changing the color of the line segment depending on a method of associating the key frames with each other. That is, the color of the line segment connecting the cones is changed depending on the step, among steps S1130, S1140, and S1160, in which the key frames are associated with each other (the relative position and orientation between the key frames are derived). In addition to the feature points and the key frames, auxiliary features may be displayed on the GUI.

If the key frames are associated with each other based on the measured values of the sensor described in the second embodiment, a line segment of another color is additionally drawn. Note that in this embodiment, the pattern of the line segment (solid line, dotted line, thick line, thin line, or the like) may be changed in addition to or instead of the change of the color of the line segment, and a display mode to be changed is not limited to the color.

Sixth Embodiment

In the first embodiment, the square, triangular, or circular auxiliary features are used for correction of the three-dimensional map. However, the auxiliary features are not limited them, and three-dimensional objects for each of which geometric information necessary for estimation of the position and orientation is known may be used. In this case, in the processing according to the flowchart shown in FIG. 4, the following processing is performed in step S1050.

That is, in step S1050 according to this embodiment, the second deriving unit 160 calculates the relative position and orientation between key frames using three-dimensional objects (to be referred to as 3D objects hereinafter) existing or arranged in a scene. In the first embodiment, the reference position and reference orientation of the key frame are calculated based on the correspondence between the three-dimensional coordinates and the image coordinates of each vertex of each auxiliary feature. In this embodiment, the reference position and reference orientation are calculated based on the pieces of geometric information of the 3D objects and an image held in the key frame. More specifically, the edge models of the 3D objects are held, and the reference position and reference orientation are calculated by a method by Drummond, et al. (T. Drummond and R. Cipolla, "Real-time Visual Tracking of Complex Structures," IEEE Transactions on Pattern Analysis and Machine Intelligence, vol. 24, no. 7, pp. 932-946, 2002).

As described above, according to this embodiment, since it is possible to use, as an auxiliary feature, an arbitrary 3D object whose geometric information necessary for estimation of a position and orientation is known, it is possible to prevent the scenery of the scene from being impaired.

Note that a method of calculating the reference position and reference orientation using 3D objects is not limited to the method using edge models, and feature points on the 3D objects or luminance information may be used. Furthermore, if a distance image can be used in addition to a normal image, the reference position and reference orientation may be calculated by fitting of a three-dimensional model to the distance image. In addition, fitting of a three-dimensional model to both the normal image and the distance image may be performed.

Seventh Embodiment

Creation of a three-dimensional map using an image and measurement of the position and orientation of an image capturing unit 170 are not limited to the method disclosed in NPL 1. For example, a method that uses explicitly detected feature points, such as a method by Klein, et al. (G. Klein and D. Murray, "Parallel Tracking and Mapping for Small AR Workspaces," Proc. 6th IEEE and ACM International Symposium on Mixed and Augmented Reality, pp. 225-234, 2007), may be used. A method that uses an RGBD camera or depth camera may be adopted.

Furthermore, the number of key frames selected to calculate the relative position and orientation with respect to a newly added key frame need not always be one, and a plurality of key frames may be selected. For example, all key frames away from the newly added key frame by a predetermined distance or more may be selected, or a plurality of key frames may be selected in descending order of the distance from the newly added key frame.

Correction of the three-dimensional map need not be performed sequentially after deriving of the position and orientation and update of the three-dimensional map. Since it takes time to correct the three-dimensional map, correction of the three-dimensional map may be performed simultaneously with driving of the position and orientation and update of the three-dimensional map using a parallel processing.

In each of the above-described embodiments and modifications, instead of separating the image capturing unit 170 or the sensor 290 from the information processing apparatus (information processing apparatus 1, 2, or 3), the image capturing unit 170 or the sensor 290 may be incorporated in the information processing apparatus to be integrated. Note that some or all of the above-described embodiments and modifications may be appropriately combined and used, or selectively used.

<Summary of Effects>

Even if the moving range of the camera is limited, it is possible to create an accurate three-dimensional map by using, for correction of the three-dimensional map, the relative position and orientation between the key frames derived using the auxiliary features arranged in the scene.

In addition, even if the moving range of the camera is limited, it is possible to create an accurate three-dimensional map by deriving the relative position and orientation between the key frames based on the measured values of the sensor that measures the position and orientation.

Furthermore, it is possible to improve the accuracy of the three-dimensional map by correcting the three-dimensional coordinates of each feature point in addition to the position and orientation of each key frame using the relative position and orientation between the key frames derived based on the auxiliary features or the measured values of the sensor.

<Summary of Definitions>

The three-dimensional map held in the holding unit 110 may be any data represented by a group of key frames each formed from the captured image, the position and orientation of the image capturing unit 170 at the time of image capturing, and the three-dimensional information of a geometric feature in the real space. For example, the three-dimensional information of the geometric feature in the real space may be three-dimensional coordinates in a coordinate system with reference to the real space, or a depth map or three-dimensional coordinates in a coordinate with respect to a key frame.

Any camera that captures an image of the real space may be used as the image capturing unit 170. For example, a camera that captures a grayscale image or a camera that captures a color image may be adopted. In addition, one camera may be used or an image capturing apparatus formed by a plurality of cameras, such as a stereo camera, may be used. Alternatively, a depth camera that captures a distance image or an RGBD camera that captures a color image and a distance image at the same time may be used.

Any unit that derives, based on an input image and a three-dimensional map, the position and orientation of the image capturing unit 170 at the time of capturing the input image may be adopted as the first deriving unit 130. For example, a unit that derives the position and orientation by setting, as feature points, points each having a large gradient of a luminance value on a grayscale image or a unit that derives the position and orientation by explicitly detecting feature points from the image may be used.

Any unit that updates the three-dimensional map using the position and orientation of the image capturing unit 170 at the time of image capturing and the image from which the position and orientation are derived by the first deriving unit 130 may be used as the update unit 140. For example, the depth map or the three-dimensional coordinates of each feature point in the existing three-dimensional map may be updated based on the derived position and orientation. Alternatively, a new key frame may be generated and added to the three-dimensional map.

Any unit that derives the relative position and orientation between the key frames may be used as the second deriving unit 160. For example, auxiliary features may additionally be arranged in the scene, and the relative position and orientation may be derived using the position and orientation of each key frame derived based on the information of the features detected on the image. Alternatively, a sensor that measures a position or orientation may be mounted on the image capturing unit 170, and the relative position and orientation may be derived based on the position or orientation of the image capturing unit 170 measured by the sensor.

Any unit that corrects the three-dimensional map based on the relative position and orientation between the key frames obtained from the second deriving unit 160 may be used as the correction unit 150. For example, only the position and orientation of each key frame may be corrected, or the depth map or the three-dimensional coordinates of each feature point may additionally be corrected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the arrangement according to the present invention, even if the moving range of an image capturing apparatus such as a camera is limited, it is possible to reduce an error accumulated in a three-dimensional map.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more processors, wherein the one or more processors function as:
a holding unit configured to hold a three-dimensional map in which three-dimensional information of a scene captured by an image capturing apparatus and a position and orientation of the image capturing apparatus are associated with each other;
a first deriving unit configured to derive, based on the three-dimensional map and an image captured by the image capturing apparatus, a first position and orientation of the image capturing apparatus at the time of capturing the image;
an update unit configured to update the three-dimensional map based on the captured image and the derived first position and orientation;
a second deriving unit configured to derive a relative position and orientation among second positions and orientations of the image capturing apparatus which are derived based on a feature in the image captured by the image capturing apparatus without referring to the three-dimensional map; and
a correction unit configured to correct the three-dimensional map based on the relative position and orientation.

2. The information processing apparatus according to claim 1, wherein the feature comprises an auxiliary feature artificially arranged in the scene.

3. The information processing apparatus according to claim 1, wherein the feature is a feature of a three-dimensional object whose geometric information is known.

4. The information processing apparatus according to claim 1, wherein the second deriving unit derives the second position and orientation based on the first position and orientation of the image capturing apparatus derived by the first deriving unit and included in the three-dimensional map.

5. The information processing apparatus according to claim 4, wherein the second deriving unit derives the second position and orientation when the newly derived first position and orientation is close to at least one of the positions and orientations included in the three-dimensional map.

6. The information processing apparatus according to claim 4, wherein the second deriving unit derives the second position and orientation when the captured image is similar to the captured image included in the three-dimensional map.

7. The information processing apparatus according to claim 4, wherein if the feature in the captured image is not sufficient, the second deriving unit uses, as the second position and orientation, the position and orientation of the image capturing apparatus included in the three-dimensional map.

8. The information processing apparatus according to claim 1, wherein the holding unit holds a plurality of pieces of key frame information as the three-dimensional map, and each of the plurality of pieces of key frame information includes an image captured by the image capturing apparatus and pieces of depth information of a plurality of feature points in the image, and is associated with the position and orientation of the image capturing apparatus.

9. The information processing apparatus according to claim 8, wherein the correction unit corrects the three-dimensional map so as to reduce a difference between a relative position and orientation among the positions and orientations of the image capturing apparatus associated with the plurality of pieces of key frame information held by the holding unit and the relative position and orientation among the second positions and orientations of the image capturing apparatus.

10. The information processing apparatus according to claim 8, wherein the update unit adds, to the three-dimensional map, as new key frame information, information including the captured image and the derived first position and orientation.

11. The information processing apparatus according to claim 8, wherein the update unit modifies the key frame information in the three-dimensional map based on information including the captured image and the derived first position and orientation.

12. The information processing apparatus according to claim 11, wherein the update unit obtains, from the three-dimensional map, as nearest key frame information, key frame information corresponding to a position and orientation closest to the derived first position and orientation and, if the captured image and an image in the nearest key frame information satisfy a predetermined similarity condition, modifies the nearest key frame information.

13. The information processing apparatus according to claim 12, wherein the predetermined similarity condition is that a ratio of the number of pixels of feature points corresponding to feature points of the nearest key frame information in the captured image is not smaller than a threshold.

14. The information processing apparatus according to claim 11, wherein the correction unit corrects the position and orientation of the image capturing apparatus in the key frame information in the three-dimensional map.

15. The information processing apparatus according to claim 11, wherein the correction unit corrects the position and orientation of the image capturing apparatus and the pieces of depth information of the feature points in the key frame information in the three-dimensional map.

16. The information processing apparatus according to claim 8, further comprising a display unit configured to display an image of a virtual space based on the three-dimensional map and display objects corresponding to the pieces of key frame information on the image of the virtual space.

17. The information processing apparatus according to claim 1, wherein the second deriving unit uses, as at least part of the second position and orientation, a measured value input from a sensor configured to measure one of a position and orientation of the image capturing apparatus.

18. An information processing method executed by an information processing apparatus, comprising:
deriving, based on a three-dimensional map in which three-dimensional information of a scene captured by an image capturing apparatus and a position and orientation of the image capturing apparatus are associated with each other and an image captured by the image capturing apparatus, a first position and orientation of the image capturing apparatus at the time of capturing the image;

updating the three-dimensional map based on the captured image and the derived first position and orientation;

deriving a relative position and orientation among second positions and orientations of the image capturing apparatus which are derived based on a feature in the image captured by the image capturing apparatus without referring to the three-dimensional map; and correcting the three-dimensional map based on the relative position and orientation.

19. A non-transitory computer-readable storage medium storing a computer program for causing a computer to function as:

a holding unit configured to hold a three-dimensional map in which three-dimensional information of a scene captured by an image capturing apparatus and a position and orientation of the image capturing apparatus are associated with each other;

a first deriving unit configured to derive, based on the three-dimensional map and an image captured by the image capturing apparatus, a first position and orientation of the image capturing apparatus at the time of capturing the image;

an update unit configured to update the three-dimensional map based on the captured image and the derived first position and orientation;

a second deriving unit configured to derive a relative position and orientation among second positions and orientations of the image capturing apparatus which are derived based on a feature in the image captured by the image capturing apparatus without referring to the three-dimensional map; and a correction unit configured to correct the three-dimensional map based on the relative position and orientation.

* * * * *